(No Model.)
H. B. PAUL.
SULKY.
No. 444,921. Patented Jan. 20, 1891.
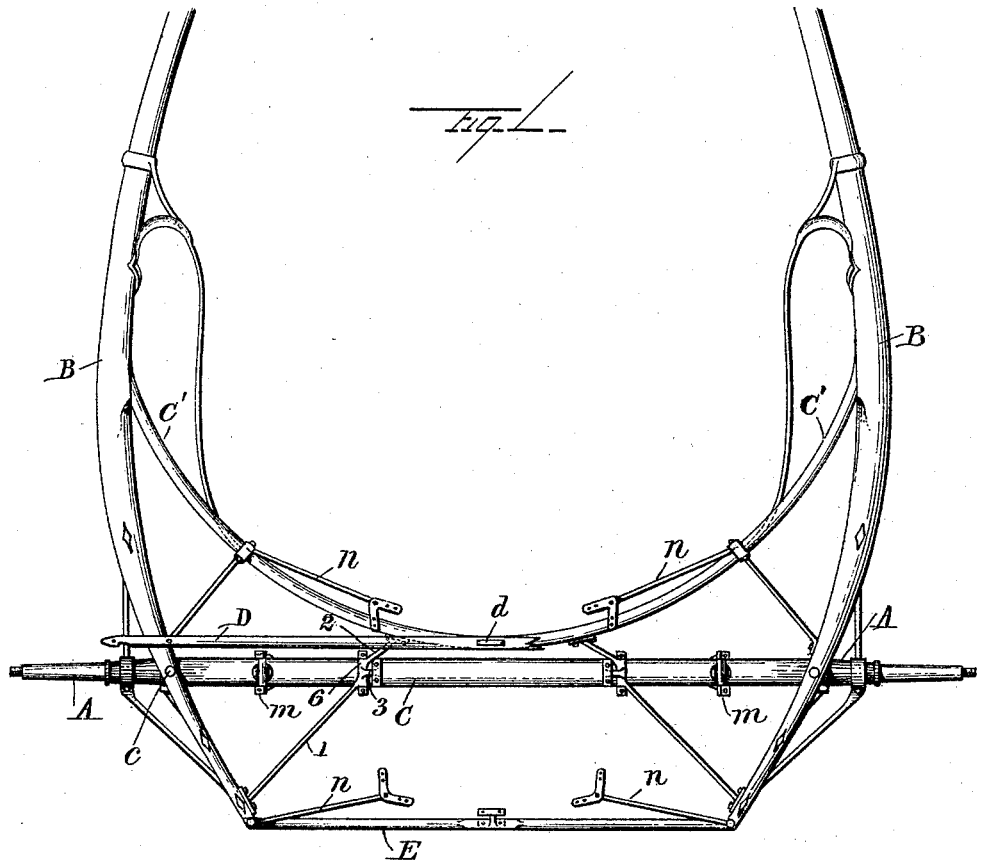
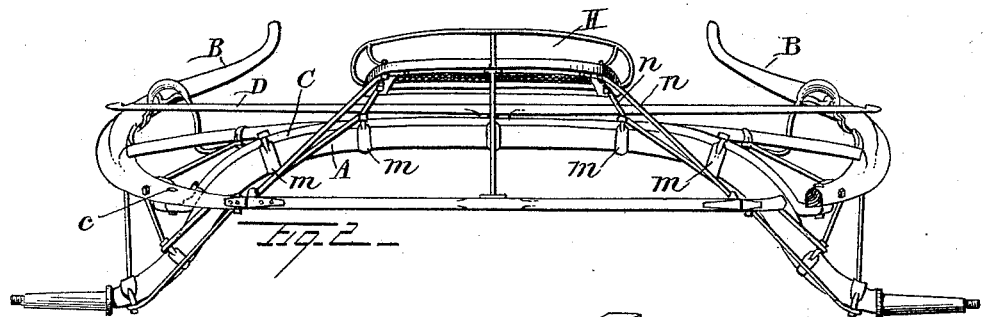
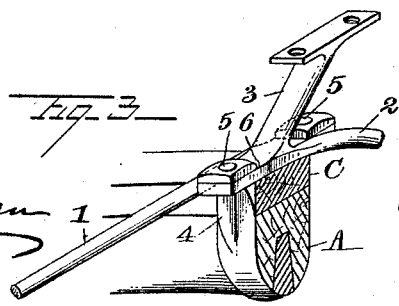
WITNESSES:
INVENTOR
Harry B. Paul
BY
ATTORNEY.

UNITED STATES PATENT OFFICE.

HARRY B. PAUL, OF CAMDEN, NEW JERSEY.

SULKY.

SPECIFICATION forming part of Letters Patent No. 444,921, dated January 20, 1891.

Application filed May 31, 1890. Serial No. 353,761. (No model.)

*To all whom it may concern:*

Be it known that I, HARRY B. PAUL, a citizen of the United States, residing at Camden, in the State of New Jersey, have invented certain new and useful Improvements in Sulkies, of which the following is a full, clear, and exact description, reference being had to the accompanying drawings, forming a part of this specification.

My invention relates to trotting-sulkies, and has for its object to more securely combine the axle-brace with the axle, the front bar with the axle-brace, and rear portion of the shafts; and it consists, primarily, of the combination and arrangement, hereinafter described, of the axle-brace with the axle and shafts, and, secondly, of the axle-brace with the rear portion of the shafts and with the front bar, and, finally, of a novel form of stay-rod and clip connecting these several parts and at the same time affording a separate and direct support for the seat.

Referring to the drawings, Figure 1 is a plan view of my improved sulky with the seat removed, so as to show more clearly the construction and arrangement of the several parts. Fig. 2 is a rear elevation thereof with the seat in position, and Fig. 3 is an elevation of my improved stay-rod and clip with a cross-sectional view of the axle and axle-brace.

My present invention in its principal feature is an improvement upon that patented to me by Letters Patent dated July 30, 1878, No. 206,606. It has been found by experience that the best results are obtained from elevating the axle not only in the central portion, but as much as possible of it to form a close junction throughout with the axle-brace which connects the two shafts at the rear and extends between the same immediately above the axle.

The shafts B B are connected together at the rear by the back cross-bar E and at the front by the front cross-bar C' of the usual curved form. The singletree D is pivoted on the top of the central portion of this front cross-bar, as usual, at *d*. The axle-brace C is elevated to a point slightly above the plane of the shafts, curving downward at each end, where it is firmly secured to the shafts at *c*. It is made of wood, preferably, and is glued to the usual frame-work in which the body of the axle is supported. The axle A, with its central supporting frame-work, is curved upward by sharp curves, so as to bring the whole portion of it that lies between the shafts in close contact with the lower side of the axle-brace C, the two being additionally held together by clips *m m*. The curved rear cross-bar of my former invention is dispensed with entirely, and in lieu thereof two stay-irons are substituted, which connect the rear portion of the shafts with the front curved cross-bar and intermediately with the axle-brace, and also serve to support the seat H, which is mounted in the usual manner upon four seat-stays *n n*, extending from each of its four corners, two to the front cross-bar C' and two to the straight rear bar E.

My improved stay-iron and clip (shown in Fig. 3) consists of a single piece of metal having a projection 1, which extends to the rear portion of the shafts, another projection 2, which extends to the front curved cross-bar C' and is bolted thereto, another projection 3, extending vertically upward to the base of the seat and supporting the same, and a central plate 6, from which each of these projections proceed, which lies flat on the top of the axle-brace C, and is secured to the same by means of a clip 4, passing around the axle-brace and axle and secured to the plate 6 of the stay-iron by nuts 5 5. The result of this construction above described is to dispense to a large extent with a number of parts heretofore considered necessary, and to supply their place with a much simpler arrangement of braces and stays. The most important feature, however, of my present invention is the combination and arrangement of the elevated axle and axle-brace relatively to each other and to the seat, that the latter shall be supported directly upon the axle-brace and as near to the axle as it is possible to get it.

Having thus described my invention, what I claim as new, and desire to secure by Letters Patent, is—

1. The combination, in a sulky with a centrally-elevated axle and its mounting A, of a centrally-elevated axle-brace C, corresponding in curvature thereto, and secured at its extreme ends to the shafts and intermediately for the greater part of its length to the axle-mounting by direct contact therewith, and a front curved cross-bar C', secured at its ends to the shafts and at its extreme center indirectly to the said axle-brace by a connecting brace or braces, substantially as described.

2. The combination, in a sulky with an axle-brace secured at its ends directly to the shafts and centrally to the axle, of a front curved cross-bar and of a pair of braces which extend from the rear ends of the shafts to said axle-brace and thence to said front cross-bar, substantially as described.

3. The combination, in a sulky, with an axle-brace, of a stay-iron and seat-stay consisting of a base-plate 6, secured to the axle-brace and having projections 1 and 2 extending, respectively, to the rear ends of the shafts and to the central portion of the front cross-bar, and a third projection extending to and secured to the under portion of the seat, substantially as described.

In testimony whereof I have hereunto affixed my signature this 23d day of May, A. D. 1890.

HARRY B. PAUL.

Witnesses:
H. J. STILER,
H. T. FENTON.